United States Patent
Bhagavatula (10) Patent No.: US 9,482,830 B2
(45) Date of Patent: Nov. 1, 2016

(54) DEVICE-TO-DEVICE OPTICAL CONNECTORS

(71) Applicant: CORNING OPTICAL COMMUNICATIONS LLC, Hickory, NC (US)

(72) Inventor: Venkata Adiseshaiah Bhagavatula, Big Flats, NY (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 0 days.

(21) Appl. No.: 14/471,062

(22) Filed: Aug. 28, 2014

(65) Prior Publication Data
US 2015/0063765 A1    Mar. 5, 2015

Related U.S. Application Data

(60) Provisional application No. 61/871,945, filed on Aug. 30, 2013.

(51) Int. Cl.
*G02B 6/42* (2006.01)
*G02B 6/32* (2006.01)
*G02B 6/43* (2006.01)

(52) U.S. Cl.
CPC ........... *G02B 6/4214* (2013.01); *G02B 6/32* (2013.01); *G02B 6/4292* (2013.01); *G02B 6/43* (2013.01)

(58) Field of Classification Search
None
See application file for complete search history.

(56) References Cited

U.S. PATENT DOCUMENTS

| | | |
|---|---|---|
| 5,384,874 A | 1/1995 | Hirai et al. ............... 385/34 |
| 5,850,493 A | 12/1998 | Cheng ....................... 385/34 |
| 6,668,119 B2 | 12/2003 | Matsumoto et al. |
| 7,603,008 B2 | 10/2009 | Matsumura et al. ...... 385/35 |
| 8,085,472 B2 | 12/2011 | Kadar-Kallen ........... 359/652 |
| 2008/0166094 A1 | 7/2008 | Bookbinder et al. |
| 2009/0154884 A1 | 6/2009 | Chen et al. |
| 2009/0169163 A1 | 7/2009 | Abbott, III et al. |
| 2010/0135618 A1 | 6/2010 | Howard et al. |
| 2011/0026882 A1 | 2/2011 | Budd et al. ............... 385/52 |
| 2011/0255825 A1 | 10/2011 | Ko et al. |

(Continued)

FOREIGN PATENT DOCUMENTS

JP    2007041222    2/2007
WO    2006108024    10/2006

OTHER PUBLICATIONS

Zickar et al, MEMS compatible micro-GRIN lenses for fiber to chip coupling of light, Optics Express, vol. 14, No. 10, pp. 4237-4249, May 15, 2006.

(Continued)

*Primary Examiner* — Jerry Rahll (57) ABSTRACT

A device-to-device optical connector assembly is configured to provide an optical signal as an expanded beam to an expanded beam plug cable. The connector assembly includes an active receptacle having a lead-in portion that receives a light beam from an opto-electronic device, a lead-out portion and a turn portion that turns the light beam and delivers a collimated light beam to the lead-out portion. A waveguide rod is optically coupled to the lead-out portion of the active receptacle that receives the collimated light beam and carries the collimated light beam from the active receptacle to the expanded beam plug cable. In one embodiment, the waveguide rod has a step index core waveguide profile with its fundamental mode generally matching the coupling optics of a complementary cable assembly or the like within a predetermined value.

19 Claims, 7 Drawing Sheets

(56) References Cited

U.S. PATENT DOCUMENTS

2014/0003767 A1* 1/2014 de Jong .............. G02B 6/4206
                                                          385/33
2014/0270659 A1* 9/2014 Schunk ...................... 385/93

OTHER PUBLICATIONS

Nakagawa et al, Lens-Coupled Laser Diode Module Integrated on Silicon Platform, Journal of Lightwave Technology, vol. 14, No. 6, Jun. 1996.

Chanclou et al, Design and demonstration of a multicore single-mode fiber coupled lens device, Optics Communications 233:333-339, 2004.

Cooper et al, A fiber optic connector suitable for use in a rugged environment, Optics and Laser Technology, pp. 87-91, Apr. 1982.

Palais, Fiber coupling using graded-index rod lenses, Applied Optics, vol. 19, No. 12, pp. 2011-2018 (Jun. 15, 1980).

Emkey et al, Analysis and Evaluation of Graded-Index Fiber-Lenses, Journal of Lightwave Technology, vol. LT-5, No. 9, Sep. 1987.

* cited by examiner

DEVICE-TO-DEVICE OPTICAL CONNECTORS

CROSS-REFERENCE

This application claims the benefit of priority under 35 U.S.C. §119 of U.S. Provisional Application Ser. No. 61/871,945 filed on Aug. 30, 2013 the content of which is relied upon and incorporated herein by reference in its entirety.

BACKGROUND

The present specification relates generally to optical connectors and, more particularly to device-to-device optical connectors.

Optical connectors are used in a variety of applications where one or more optical fibers of a set of optical fibers are in optical communication with another set of one or more optical fibers, circuit boards, or other devices. Various small form factor connectors have been proposed. However, many of the small form factor connectors must be fabricated precisely and are susceptible to dust and other environmental factors.

For device-to-device optical connector (DDOC) type consumer applications, expanded beam optical connector assemblies have been proposed. Expanded beam connectors include optics that increase beam diameter and/or collimate a light beam, which can mitigate the effects of dust and other factors. Such connectors are expected to be used to transfer high bandwidth data between electronic devices, such as smart phones, laptop personal computers, high speed processors, graphic modules, and other such electronic and mobile communication or consumer devices. The connectors are also expected to meet a variety of consumer electronic related criteria, such as small form factor, low cost, low loss for bandwidth performance, ease of cleaning, etc. Although, the received light beam is manipulated for improved performance there still are challenges for alignment and preserving optical performance of optical connector assemblies.

One type of optical connector assembly is an optical receptacle optical connector that may be used on an electronic device. These connectors are assembled into links with the active devices and coupling optics located centrally on the circuit board. A relay fiber is typically used to relay optical signals to an expanded beam connector located at an edge of the circuit board. A cable assembly having an expanded beam plug cable may then be used to optically couple a pair of devices together by receiving and/or delivering optical signals to and/or from the expanded beam connector. In another variation, the passive receptacle can be aligned with opto-electronic devices such as laser diodes and/or photodiodes disposed on the circuit board, thereby eliminating the need for relay fibers. However, in this configuration the opto-electronic devices must be located relatively close to the edge of the circuit board which can be challenging for the design of the circuit board and/or the electronic device.

SUMMARY

In one embodiment, an optical connector assembly providing an optical signal as an expanded beam for an expanded beam plug cable is disclosed. The connector assembly includes an active receptacle having a collimator having a lead-in portion that receives a light beam from an opto-electronic device, a lead-out portion and a turn portion that turns the light beam and delivers a collimated light beam to the lead-out portion and a waveguide rod. The waveguide rod is optically coupled to the lead-out portion of the collimator and receives the collimated light beam and carries the collimated light beam from the active receptacle to an optical interface of the connector assembly.

In another embodiment, a device comprises a circuit board comprising an optical connector assembly for connecting to an expanded beam cable for delivering optical signals thereto along with an opto-electronic device. The opto-electronic device is carried by the circuit board that is configured to convert electrical signals to optical signals in the form of a light beam. The optical connector assembly includes an active receptacle comprising a collimator with a lead-in portion that receives a light beam from the opto-electronic device, a lead-out portion and a turn portion that turns the light beam and carries the collimated the light beam from the active receptacle to an optical interface of the optical connector assembly. The optical connector assembly also comprises a waveguide rod optically coupled to collimator that receives the collimated light beam and carries the collimated light beam from the active receptacle to an optical interface of the optical connector assembly.

In another embodiment, a method of providing an optical signal as an expanded beam using an optical connector assembly is disclosed. The method includes providing a light beam from an opto-electronic device carried by a circuit board to an optical connector assembly, expanding and collimating the light beam using the optical connector assembly. The optical connector assembly comprising an active receptacle comprising a collimator with a lead-in portion that receives a light beam from the opto-electronic device, a lead-out portion and a turn portion that turns the light beam and delivers a collimated light beam to the lead-out portion, and a waveguide rod optically coupled to the collimator that receives the collimated light beam and carries the collimated light beam from the active receptacle to an optical interface of the optical connector assembly. The method also comprises delivering the collimated light beam to a waveguide rod optically coupled to the collimator and carrying the collimated light beam to the optical interface of the optical connector assembly.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments described herein generally relate to optical connector assemblies such as device-to-device optical connector (DDOC) assemblies for consumer applications; however, the DDOC assemblies could be used in non-consumer contexts as well or for applications other than device-to-device purposes. The DDOC optical connector assemblies are generally associated with a circuit board and utilize a waveguide rod in conjunction with expanded beam optics to deliver a collimated beam from the expanded beam optics toward an expanded beam connector of, for example, an expanded beam plug cable, without any use of intervening relay components, such as a relay fiber therebetween. Such an arrangement can allow placement of active devices near an edge of the circuit board, while delivering the collimated beam to the edge with low losses. If the waveguide rod is formed of glass material, the waveguide rod can also provide a durable and surface accessible interface than can readily be cleaned of any contamination, such as dust, oils, etc.

Figure 1:
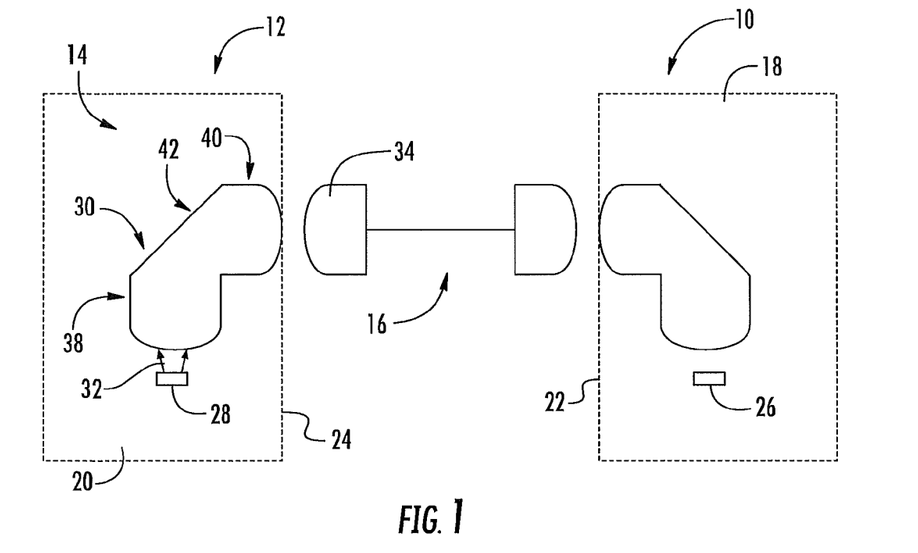
FIG. 1 is a schematic view of an exemplary approach to deliver optical signals between devices.

Referring to FIG. 1 and by way of introduction, an exemplary active approach to deliver optical signals to a device 10 from another device 12 is illustrated. This exemplary approach demonstrates a DDOC optical connector assembly 14 that sends optical signals as an expanded beam as an output to an expanded beam plug cable 16, which then delivers the optical signals to the device 10. However, the same principles can be applied in reverse for receiving optical signals by the device 12 from the device 10. Additionally, the same or similar principles can be applied in either electrical-to-optical or optical-to-optical contexts.

In the illustrative embodiment of FIG. 1, the device 10 includes a circuit board 18 and the device 12 includes a circuit board 20. In some embodiments, the circuit boards 18 and 20 include connection interface components (e.g., USB ports) located at and represented by edges 22 and 24 of the circuit boards 18 and 20. The interface components may be placed at or near edges 22 and 24 of the circuit boards 18 and 20 to facilitate exposure through a housing and access by a user. As examples of devices, the circuit boards 18 and 20 may be found in smart phones, computers, printers, digital versatile disk (DVD) drives, compact disk read-only-memory (CD-ROM) drives, CD-ROM Writer (CDRW) drives, pointing devices (e.g., computer mouse), keyboards, joy-sticks, hard-drives, speakers cameras, and the like. Opto-electronic devices 26 and 28 may also be provided by the circuit boards 18 and 20. The opto-electronic devices 26 and 28 may include optical transmitter components (e.g., optical transmitter arrays, broad area emitters, vertical-cavity surface-emitting laser (VCSEL), LED etc.) and/or optical detector components (e.g., optical detector arrays, broad area detectors, photodectors, etc.).

The DDOC optical connector assembly 14 includes an active receptacle 30, such as one or more molded lenses or prisms. The active receptacle 30 receives a light beam from the opto-electronic device 28, collimates the light beam (represented by element 32) and delivers the light beam 32 to an expanded beam connector 34 of the expanded beam plug cable 16. In the illustrated embodiment, the active receptacle 30 includes a lead-in portion 38 that receives the light beam and a lead-out portion 40 that delivers the light beam 32 to the expanded beam connector 34. Between the lead-in portion 38 and the lead-out portion 40 is a turn portion 42 that turns the light beam in a direction (e.g., 90 degrees) that is different from the direction the light beam is received. As one example, the turn portion 42 may include a reflective surface that is used to reflect the light beam. In other embodiments, a prism or some other beam turning component may be used.

As represented by FIG. 1, the active devices, such as opto-electronic device 28 are located relatively close to the edge 24 of circuit board 20, which reduces the need for any relay fiber and associated optics. However, such an arrangement can result in precise placement of the active devices a short distance from the edge 24 and can restrict the freedom to locate the active devices and their associated electronics on the circuit board 20.

Figure 2A:
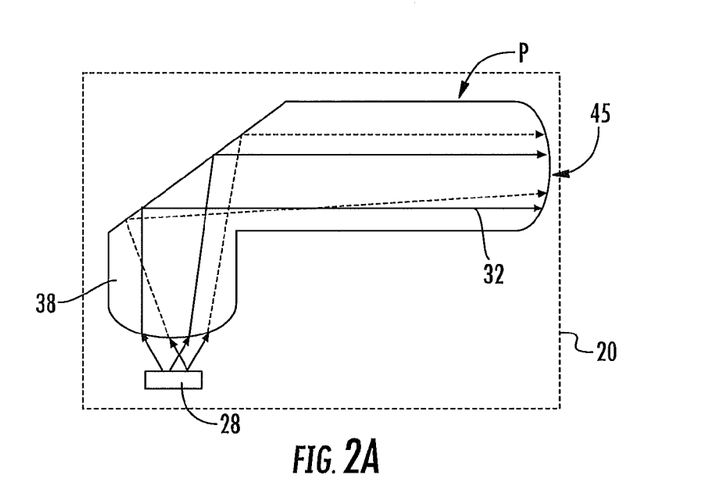
FIGS. 2A and 2B are schematic views illustrating misalignment losses due to an optical lever effect of the optical component.
Figure 2B:
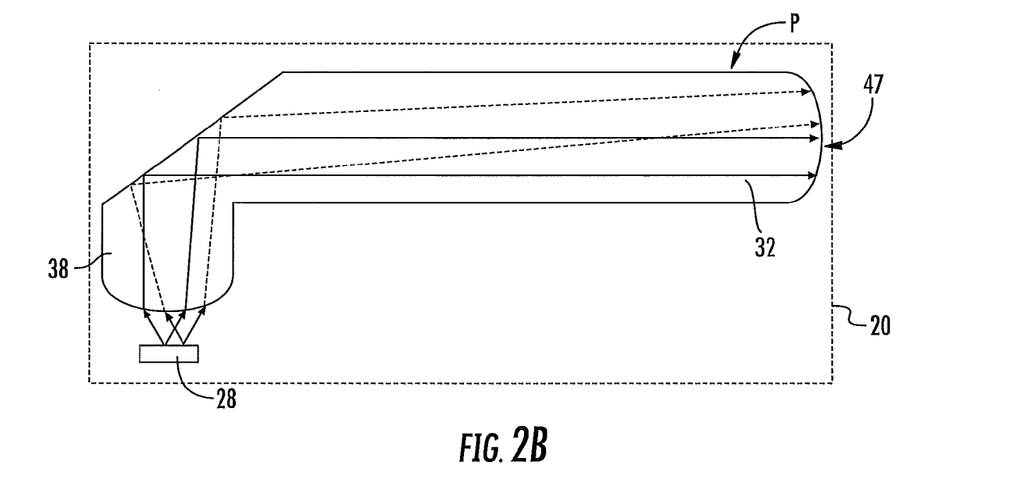

FIGS. 2A and 2B schematically depict misalignment tolerance issues that can occur if the optical receptacle has an optical component that has lengthened leg so that the active devices and associated electronics can be located further from the edge of circuit board 20. Referring to FIG. 2A, if the optical path P of the light beam 32 is extended to place the active devices further from the edge 24, misalignment of the light beam transmitted by the optical component 45 may also be increase due to the optical lever effect. Optical lever effects increase as the length of light path in the optical component increases so that the light beam being transmitted is displaced from its desired target location at the lead-out portion of the optical component. FIG. 2A shows the desired target location for light beam 32 in solid lines and the dashed lines of optical path represent the misalignment effects that may occur with the lengthened leg of the optical component. Further, the adverse misalignment effects increase as the length of the optical path of the optical component increases as shown in FIG. 2B. FIG. 2B is similar to FIG. 2A and shows an extended horizontal leg for the optical component which can cause increased misalignment issues. As represented by the dashed lines the optical path may be farther from the desired target location for light beam 32 as represented by the solid lines. Consequently, the optical connectivity provided by optical receptacles having optical components which such extended legs such as shown in FIGS. 2A and 2B may suffer optical performance issues.

Figure 2C:
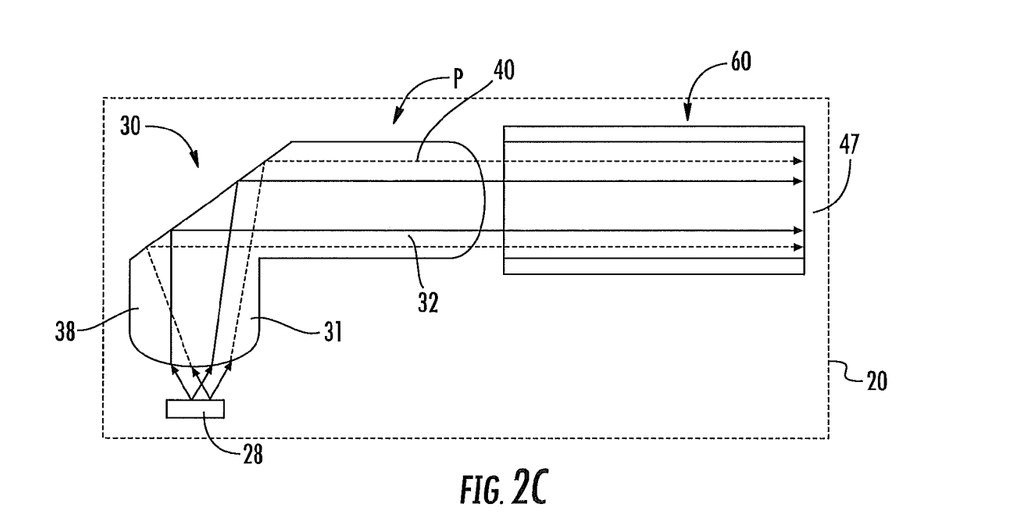
FIG. 2C is schematic view illustrating the optical pathway formed by a collimator and a waveguide rod according to concepts of the application.

FIG. 2C depicts an improvement for addressing the optical lever effects for an optical connector assembly 20 such as an optical receptacle. An optical connector assembly 20 provides an expanded beam connector assembly comprising an active receptacle 30 having a collimator 31 with a lead-in portion 38 that receives a light beam from an opto-electronic device 28, a lead-out portion 40 and a turn portion 42 that turns the light beam 32 and delivers a collimated light beam to the lead-out portion 40 and a waveguide rod 60. The waveguide rod 60 is optically coupled to the lead-out portion 40 of the collimator 31 and receives the collimated light beam 32 and carries the collimated light beam 32 from the active receptacle to an optical interface 47 of the connector assembly 20. Thus, the optical connector assembly is an active receptacle having a collimator for making the optical turn that is optically coupled to a waveguide rod that provides the optical interface for the optical connector.

Figure 3:
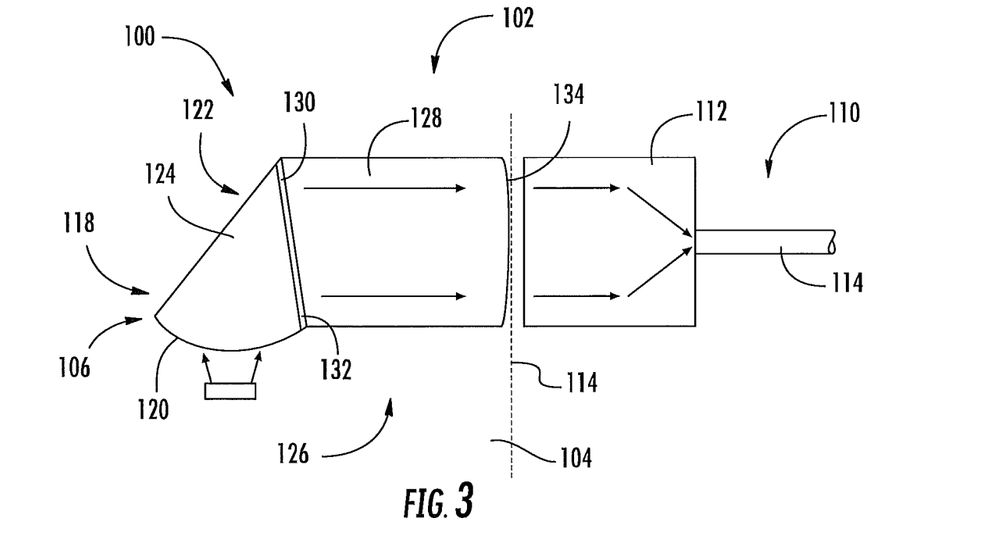
FIG. 3 illustrates an embodiment of a device-to-device connector assembly.

Referring to FIG. 3, another embodiment of an optical connector assembly 100 for use with device 102 and circuit board 104 is illustrated schematically. As depicted, the optical connector assembly 100 includes many of the features described above including an active receptacle 106 and an opto-electronic device 108 carried by the circuit board 104. An expanded beam plug cable 110 includes an expanded beam connector 112 that is located at an edge 114 of the circuit board 104. The expanded beam connector 112 is connected to an optical fiber 115 that delivers optical signals between the device 102 and another device connected thereto.

The active receptacle 106 includes a collimator 118 including a lens 120 (e.g., a positive lens) and a turn portion 122 including a prism structure 124. The opto-electronic device 108 and active receptacle 106 are located a short distance from the edge 114 of the circuit board 104 providing a gap 126 between the active receptacle 106 and the edge 114. A waveguide rod 128 is provided that spans at least part of the gap 126 between the active receptacle 106 and the edge 114.

Figure 4:
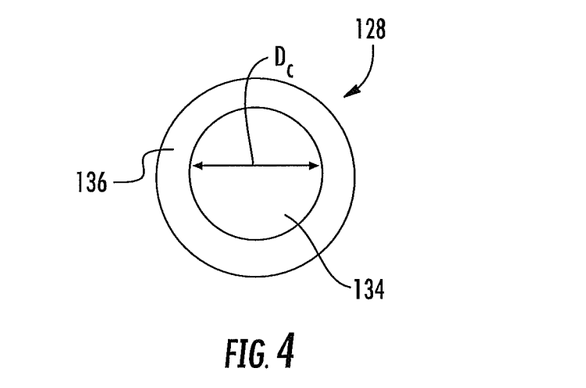
FIG. 4 illustrates an end view of an embodiment of a waveguide rod for use with the device-to-device connector assembly of FIG. 3.

The waveguide rod 128 includes a coupling face 130 that is physically and optically coupled to the turn portion 122. For example, an index matching gel or adhesive 132 may be used to couple the waveguide rod 128 to the turn portion 122. The waveguide rod 128 further includes an edge facing face 134 that is located flush or in close proximity of the edge 114. Referring briefly to FIG. 4, the waveguide rod 128 may be a multimode waveguide having a core 134 with a refractive index $n_1$ and a cladding 136 having a refractive index $n_2$, where $n_2$ is less than $n_1$ providing a low index difference step index core waveguide.

Figure 5:
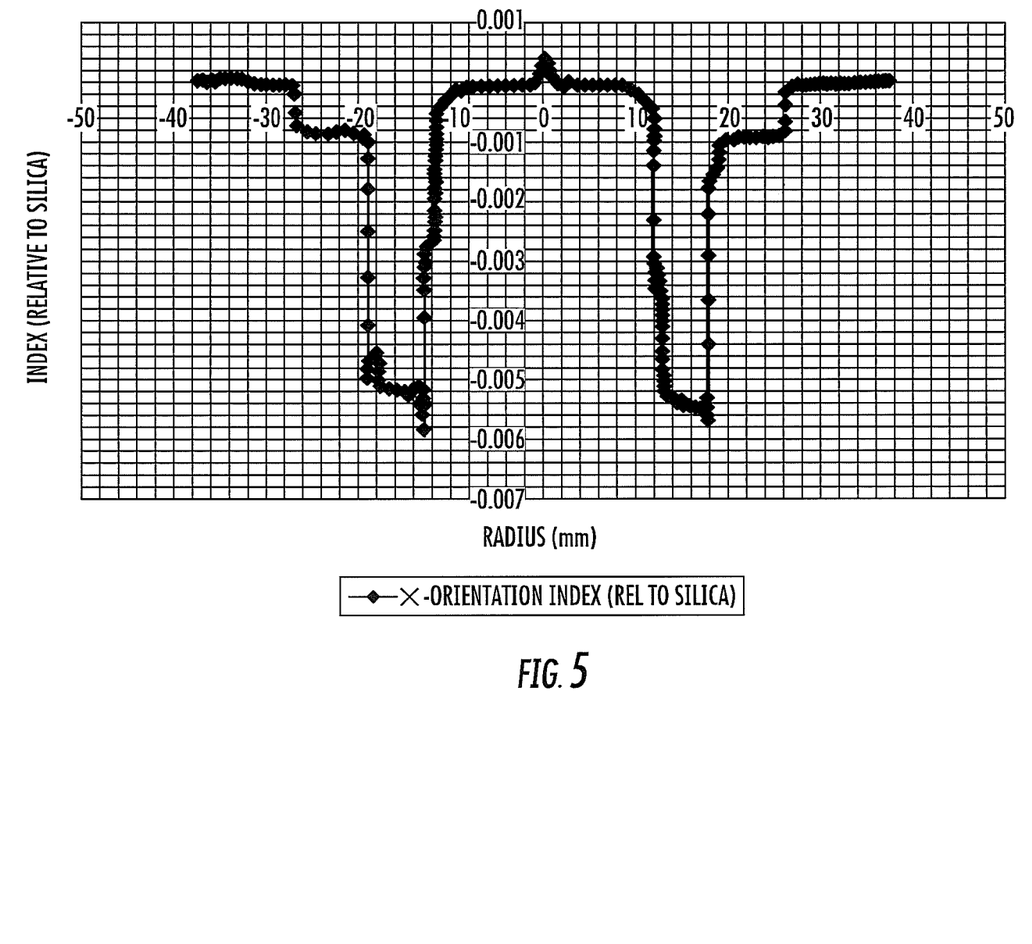
FIG. 5 illustrates an exemplary refractive index profile for a waveguide rod.

As mentioned, the waveguide rod 128 can be a low index difference, step index core waveguide. The waveguide rod 128 can be formed such that the fundamental mode of the waveguide rod 128 matches or nearly matches the collimated beam exiting the active receptacle 106. The fundamental mode of the waveguide rod 128 can be evaluated based on the core diameter $D_c$ (FIG. 3) and the refractive index difference between the core 134 and the cladding 136. Such waveguide rods 128 can be formed using standard fabrication techniques, which can lead to low loss waveguide rods 128 with precise diameters and concentricity. As one example, the waveguide rods 128 can be formed using a silica core and fluorine doped cladding blank. FIG. 5 illustrates a refractive index profile of such an exemplary waveguide rod including a silica core and fluorine doped cladding formed using a vapor deposition process for depositing the cladding. As can be seen, the refractive index of the cladding is approximately 0.005 lower than the core. Even with a refractive index difference of about 0.5 percent, the waveguide rod can capture the collimated light beam, even with some misalignment (e.g., of about one to two degrees).

Figure 6:
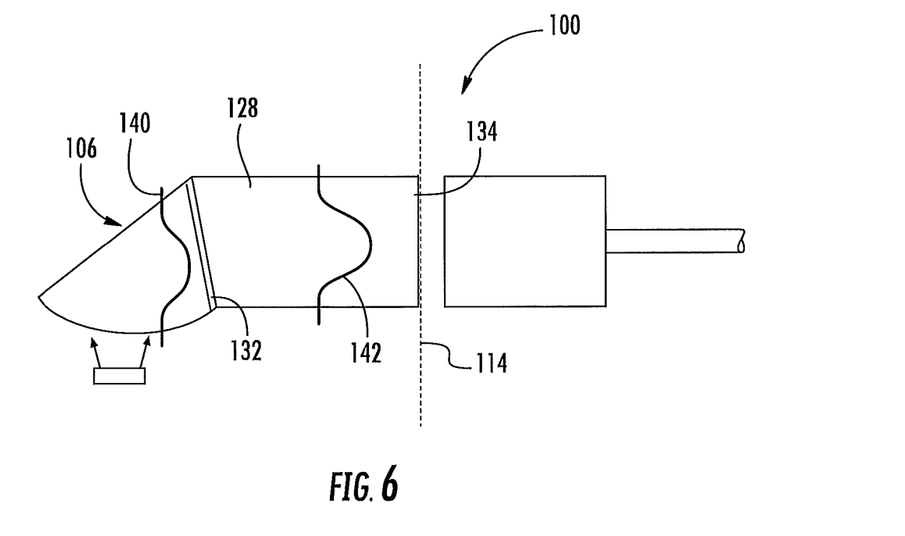
FIG. 6 illustrates operation of the device-to-device connector assembly of FIG. 3.

Referring to FIG. 6, operation of the optical connector assembly 100 is illustrated. To excite the fundamental mode of the waveguide rod 128, such as one including a silica core and fluorine doped cladding, the arrangement of FIG. 6 may be used. The fundamental mode 140 generated by the active receptacle 106 when producing the collimated light beam is coupled to the waveguide rod 128 with the waveguide rod adjacent the exit of the active receptacle 106. The fundamental mode 140 excites the fundamental mode 142 of the waveguide rod 128. In some embodiments, the core diameter $D_c$ closely matches the collimated beam diameter (e.g., between about 100 μm and about 350 μm). The index matching adhesive 132 can be used to couple the active receptacle 106 and the waveguide rod 128. This arrangement couples all of the light from the collimated light beam very efficiently to the fundamental mode 142 of the waveguide rod 128. The mode size does not change with propagation distance and is centered with respect to the waveguide axis. With such a low loss waveguide feature, any optical lever effect is minimized, but at the same time, the expanded beam can propagate longer distances to the card edge 114 while confined to the waveguide rod 128. The output facet 134 of the waveguide rod 128 can be used as a reference for connecting an expanded beam plug cable 154 very precisely for a low loss optical connection.

Figure 7:
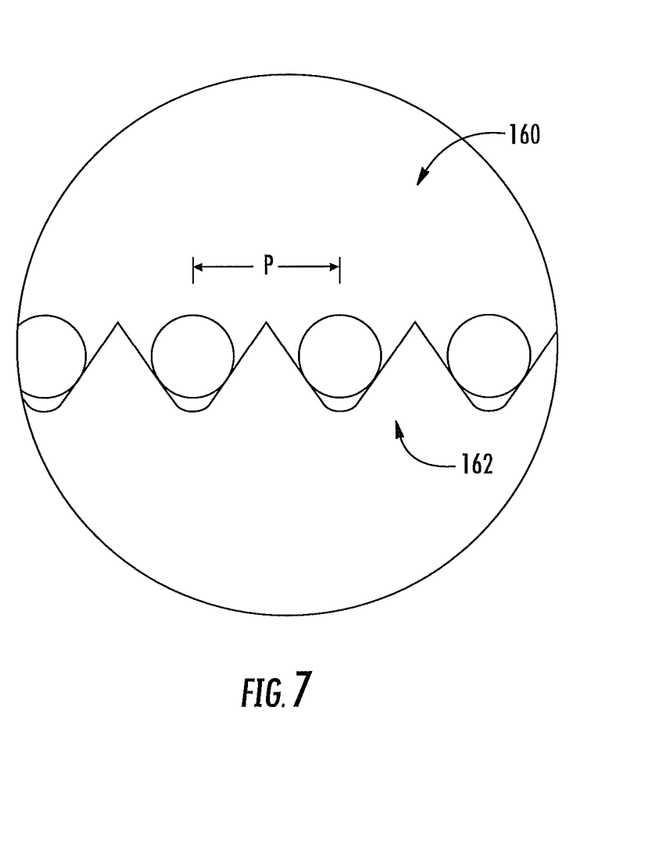
FIG. 7 is a schematic view of an embodiment of a v-groove array for aligning an array of waveguide rods.

The optical connector assemblies and methods can be flexible and can cover a broad range of beam sizes. For expanded beam connectors, to provide the benefit low losses, the beam diameter can be in the range of about 100 to about 300 μm and still have the small form factors needed for consumer-type applications. Commercially available optical components such as VCSEL and detector arrays are generally spaced at 250 μm pitch. Thus, the pitch for the active receptacle array can be 250 μm or some multiple of 250 μm, but other suitable values for the pitch are possible. With a 250 μm pitch, the diameter of the waveguide rod can be at most 250 μm with a core diameter $D_c$ of about 200 μm and a 25 μm thick cladding. The corresponding fundamental mode with near Gaussian shape can be calculated for the known value of the core diameter $D_c$ and the core/clad index difference and operating wavelength. The coupling optics of the active receptacle can be designed such that the expanded beam matches the fundamental mode of the waveguide rod. Arrays with other pitch values can be used. For example, an array 160 with 500 μm pitch with a corresponding v-groove array 162 is shown by FIG. 7.

Figure 8:
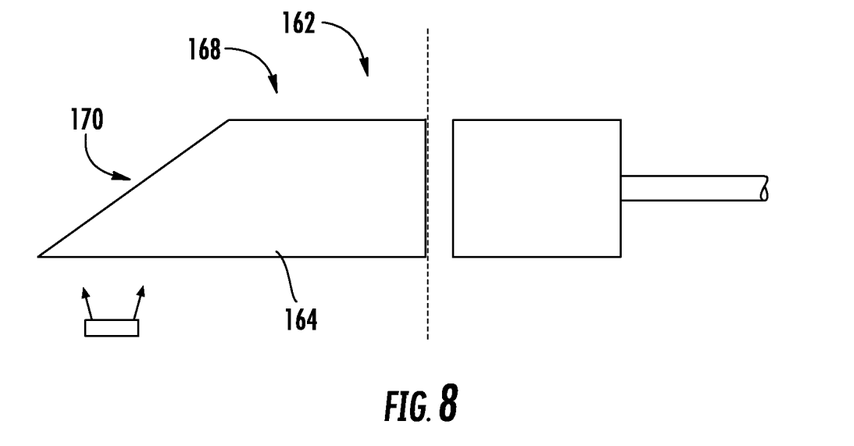
FIG. 8 depicts another embodiment of a device-to-device connector assembly.

Referring to FIG. 8, another embodiment of an optical connector assembly 162 uses an appropriate length gradient index (GRIN) lens as part of waveguide rod 164. In this embodiment, the waveguide rod 164 includes the GRIN lens portion 168 and a turn portion 170 that is formed as an integral part of the waveguide rod 164. The turn portion 170 may be formed using any suitable process, such as polishing, laser shaping or any combination of processes. The GRIN lens length can be increased by $((n/2)+¼)$ L, where L is the pitch length of the GRIN lens portion 168 and n is the refractive index.

Figure 9:
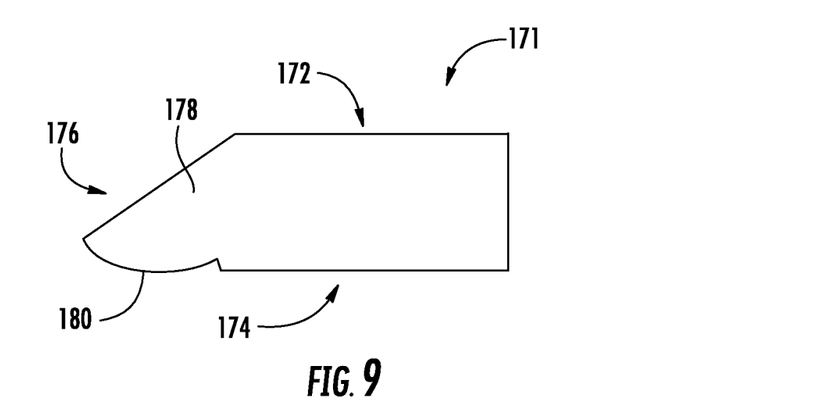
FIG. 9 illustrates another embodiment of a device-to-device connector assembly.
Figure 10:
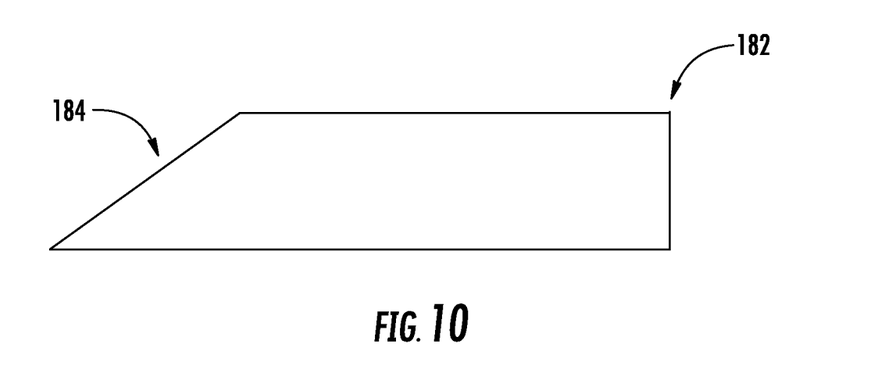
FIG. 10 illustrates another embodiment of a device-to-device connector assembly.
Figure 11:
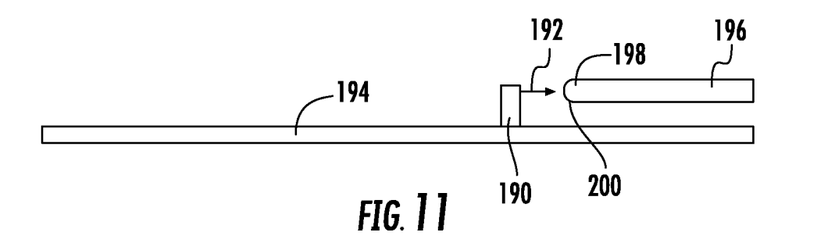
FIG. 11 illustrates another embodiment of a device-to-device connector assembly.
Figure 12:
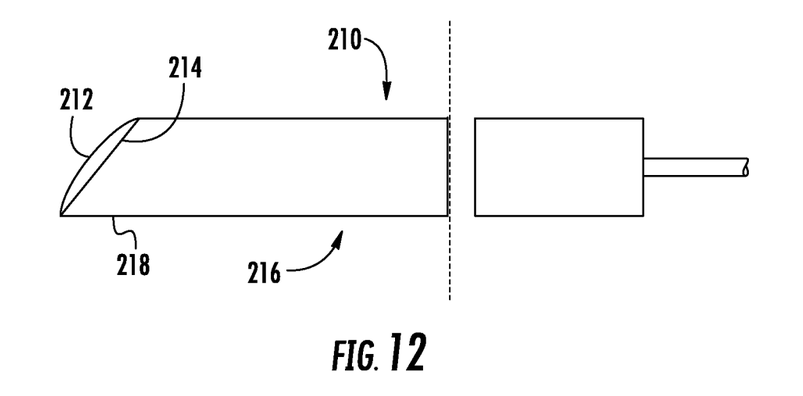
FIG. 12 illustrates another embodiment of a device-to-device connector assembly.

Referring to FIG. 9, another embodiment of an optical connector assembly 171 includes a step core 172 as part of waveguide rod 174 with a turn portion 176 that can be formed of a beam bending prism structure 178 and a shaped refractive lens structure 180 integrated with the step core 172. The prism structure 178 can be formed using any suitable process such as dicing and polishing. FIG. 10 illustrates another embodiment formed of a step index waveguide rod 182 with integrated beam bending prism structure 184. In addition to beam bending active receptacles, in some embodiments, an in-line configuration may be provided where the turn (e.g., 90 degrees) is incorporated in an active device. In these embodiments, the active device, instead of being mounted on a circuit board with light emission perpendicular to the circuit board, the active device can be mounted so that the light beam is parallel to the circuit board and the electrical leads have a 90 degree turn, as an example. FIG. 11 illustrates such an in-line arrangement including the active device 190 that directs a light beam 192 parallel to the circuit board 194 to a step index waveguide rod 196 that has an input facet 198 that is shaped to provide a lens structure 200. Referring to FIG. 12, another embodiment of an optical connector assembly 210 uses a mirror 212 or a combination of a refractive lens and a mirror. In this embodiment, the mirror 212 can be shaped on a beam bending facet 214 of waveguide rod 216. It is also possible to include a refractive lens on a bottom facet 218 of the waveguide rod 216. In some embodiments, a surface of the cladding of the waveguide rod may be shaped (e.g., flat or bi-conic), for example, to provide beam bending and/or shaping properties.

As used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, the disclosures of which are incorporated herein by reference in their entireties.

It will be apparent to those skilled in the art that various modifications and variations can be made without departing from the spirit or scope of the application. Since modifications combinations, sub-combinations and variations of the disclosed embodiments incorporating the spirit and substance of the application may occur to persons skilled in the art, the application should be construed to include everything within the scope of the appended claims and their equivalents.

What is claimed is:

1. An optical connector assembly providing an expanded beam, the connector assembly comprising:
   an active receptacle having a collimator with a lead-in portion including a lens that receives a light beam from an opto-electronic device, a lead-out portion and a turn portion that turns the light beam and delivers a collimated light beam to the lead-out portion; and
   a step index waveguide rod comprising a core having a first refractive index and a cladding having a second refractive index that is less than the first refractive index, wherein the step index waveguide rod is optically coupled to the lead-out portion of the collimator and receives the collimated light beam and carries the collimated light beam from the active receptacle to an optical interface of the connector assembly.

2. The connector assembly of claim 1, wherein a difference between the first and second refractive indexes is about 0.5 percent.

3. The connector assembly of claim 1, wherein the core comprises silica and the cladding comprises fluorine.

4. The connector assembly of claim 1, wherein the step index waveguide rod has a fundamental mode that matches a diameter of the collimated beam.

5. The connector assembly of claim 1, wherein the step index waveguide rod is coupled to the active receptacle using an index matching adhesive.

6. The connector assembly of claim 1, wherein the active receptacle is integrated with the step index waveguide rod.

7. The connector assembly of claim 1, wherein the step index waveguide rod comprises a gradient index lens portion.

8. The connector assembly of claim 1, wherein the turn portion is configured to turn the light beam about 90 degrees.

9. A device comprising:
   a circuit board comprising an optical connector assembly for connecting to an expanded beam cable for delivering optical signals thereto;
   an opto-electronic device carried by the circuit board that is configured to convert electrical signals to optical signals in the form of a light beam;
   the optical connector assembly comprising:
      an active receptacle comprising a collimator with a lead-in portion including a lens that receives a light beam from the opto-electronic device, a lead-out portion and a turn portion that turns the light beam and delivers a collimated light beam to the lead-out portion; and
      a step index waveguide rod comprising a core having a first refractive index and a cladding having a second refractive index that is less than the first refractive index, wherein the step index waveguide rod is optically coupled to collimator that receives the collimated light beam and carries the collimated light beam from the active receptacle to an optical interface of the optical connector assembly.

10. The device of claim 9 further comprising an expanded beam cable connected to the interface component.

11. The device of claim 9, wherein the active receptacle has a lead-in portion that receives the light beam from the opto-electronic device, a lead-out portion and a turn portion that turns the light beam and delivers the collimated light beam to the lead-out portion.

12. The device of claim 11, wherein the turn portion is configured to turn the light beam about 90 degrees.

13. The device of claim 9, wherein a difference between the first and second refractive index is about 0.5 percent.

14. The device of claim 9, wherein the core comprises silica and the cladding comprises fluorine.

15. The device of claim 9, wherein the step index waveguide rod has a fundamental mode that matches a diameter of the collimated beam.

16. The device of claim 9, wherein the step index waveguide rod is coupled to the active receptacle using an index matching adhesive.

17. The device of claim 9, wherein the active receptacle is integrated with the step index waveguide rod.

18. The device of claim 9, wherein the step index waveguide rod comprises a gradient index lens portion.

19. A method of providing an optical signal as an expanded beam using an optical connector assembly, the method comprising:
   providing a light beam from an opto-electronic device carried by a circuit board to an optical connector assembly;
   expanding and collimating the light beam using the optical connector assembly, the optical connector assembly comprising:
      an active receptacle comprising a collimator with a lead-in portion including a lens that receives a light beam from the opto-electronic device, a lead-out portion and a turn portion that turns the light beam and delivers a collimated light beam to the lead-out portion; and
      a step index waveguide rod comprising a core having a first refractive index and a cladding having a second refractive index that is less than the first refractive index, wherein the step index waveguide rod is optically coupled to the collimator that receives the collimated light beam and carries the collimated light beam from the active receptacle to an optical interface of the optical connector assembly; and
   delivering the collimated light beam to the step index waveguide rod optically coupled to collimator and carrying the collimated light beam to an optical interface of the optical connector assembly.

* * * * *